(12) United States Patent
Saraf et al.

(10) Patent No.: US 6,388,013 B1
(45) Date of Patent: May 14, 2002

(54) POLYOLEFIN FIBER COMPOSITIONS

(75) Inventors: Anil W. Saraf, Mason; Michael Bridges, Cincinnati, both of OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 09/754,732

(22) Filed: Jan. 4, 2001

(51) Int. Cl.$^7$ .......................... C08L 23/00; C08L 23/04; C08L 33/00; C08L 25/02
(52) U.S. Cl. .................. 525/191; 525/222; 525/232; 525/240; 525/241
(58) Field of Search ................................ 525/191, 222, 525/232, 240, 241

(56) References Cited

U.S. PATENT DOCUMENTS

| | | |
|---|---|---|
| 4,442,057 A | 4/1984 | Brody |
| 4,442,266 A | 4/1984 | Brody |
| 4,518,744 A | 5/1985 | Brody |
| 4,987,030 A | 1/1991 | Saito et al. |
| 5,073,453 A | 12/1991 | Knorr |
| 5,236,775 A | 8/1993 | Swoboda et al. |
| 5,468,259 A | 11/1995 | Sheth et al. |
| 5,514,471 A | 5/1996 | Okano et al. |
| 5,550,192 A | 8/1996 | Sheth et al. |
| 5,565,522 A | 10/1996 | Bohringer et al. |
| 5,576,366 A | 11/1996 | Sheth |
| 5,713,601 A | 2/1998 | Bonigk |
| 5,846,654 A | 12/1998 | Modrak |
| 5,902,672 A | 5/1999 | Swoboda et al. |

OTHER PUBLICATIONS

*The Hercules Spectrum of Hydrocarbon Resins*: Hercules Incorporated Resins Division, Wilmington DE 19894–0001 (900–204B 7–95).

*Primary Examiner*—Nathan M. Nutter
(74) *Attorney, Agent, or Firm*—Gerald A. Baracka; William A. Heidrich

(57) ABSTRACT

Polyolefin fibers, primarily polypropylene fibers, having improved properties are provided. The ability to produce fibers having an improved balance of properties including increased tenacity, modulus and elongation, is accomplished by incorporating from 1 to 10 weight percent aromatic hydrocarbon resin in the polypropylene fiber-forming composition which can be based on a propylene homopolymer or copolymer or blend of these propylene polymer resins with a non-propylene-containing resin.

14 Claims, No Drawings

POLYOLEFIN FIBER COMPOSITIONS

BACKGROUND OF THE INVENTION

1. Field of the Invention

The invention relates to polyolefin fibers which contain a small amount of a hydrocarbon resin and to a process for the production thereof Polyolefin fibers, most notably polypropylene fibers, produced in accordance with the invention have improved tenacity and exhibit other improved characteristics.

2. Description of the Prior Art

It is known to incorporate small amounts of additives in polymer compositions used to produce fibers to improve processing and, in some instances, fiber characteristics. The additives can include other polymers. This approach has been widely utilized with polyesters, polyamides and polyolefins, including polypropylene.

The addition of a small amount of additive polymer capable of forming an anisotropic melt with a fiber-forming polymer in the temperature range at which fibers are spun is disclosed in U.S. Pat. Nos. 4,442,057 and 4,442,266. The additive polymers are liquid crystal polymers such as copoly chloro 1,4 phenylene ethylene dioxy 4,4' dibenzoate/terephthalate and copolymers of 6-oxy-2 naphthoyl and p-oxybenzoyl moieties. Fiber-forming polymers to which the additive polymers can be added include polyesters, polyamides and polypropylene.

U.S. Pat. No. 4,518,744 discloses an improved melt spinning process and fibers obtained by the addition of 0.1 to 10 weight percent of a polymer which is immiscible in a melt of common fiber-forming polymers such as polyester, copolyesters, polyamides, copolyamides and polyolefins. While the immiscible polymers can be from the same chemical family as the fiber-forming polymer, the immiscible polymer must have an extensional viscosity such that molten spheres of the additive polymer deform into microfibrils along the spinning threadline.

Imidated polyalkyl methacrylate is added to polyethylene terephthalate at a 0.1 to 5 weight percent level in U.S. Pat. No. 5,565,522 to improve spinning and reduce thread break.

Aromatic resins of pure or mixed aromatic monomer feed streams and which may be partially hydrogenated are known and used for various non-fiber applications. For example, resins made from pure aromatic feed streams are recommended as flow modifiers for use in paint, caulking, coating and adhesive applications. Selectively partially hydrogenated resins polymerized from mixed aromatic feed streams are used as tackifiers for polyolefin, ethylene-vinyl acetate and styrenic block copolymers. Selectively partially hydrogenated resins obtained from styrenic monomers are used for polymer-based adhesives, caulk, sealants and coatings. Certain of these aromatic hydrocarbon resins are also disclosed for use with polyolefin resin films. At 8 to 15 weight percent levels, they are reported to increase stiffness, reduce MVTR, improve opticals and decrease elasticity of polypropylene films. While numerous applications have been suggested for these aromatic resins, nowhere is it suggested that the resins can be used for polyolefin fiber production or that any advantages may result therefrom.

SUMMARY OF THE INVENTION

The present invention provides polyolefin fibers with improved tenacity obtained by the addition of a small amount of aromatic hydrocarbon resin to the polyolefin. More specifically, the invention relates to improved polypropylene fibers extruded and drawn from a blend comprising polypropylene and 1 to 10 weight percent aromatic hydrocarbon resin derived from a fully or partially hydrogenated oligomeric mixture of compounds which exhibit higher tenacity at equivalent elongations and/or higher elongations at equivalent tenacity than that of fibers produced from conventional homopolymer polypropylene of the same melt flow. Fibers made using the above composition have the ability to process at higher speeds and in finer deniers.

More specifically, the fibers of the invention are comprised of from 90 to 99 weight percent polypropylene and 1 to 10 weight percent aromatic hydrocarbon resin selected from the group consisting of selectively hydrogenated resins of polymerized styrenic-based polymers, resins obtained from polymerized mixed aromatic monomer/feed streams and resins obtained by polymerizing pure monomer feed streams. In a highly useful embodiment of the invention, the aromatic hydrocarbon additive resin has a weight average molecular weight from about 300 to 8000 and molecular weight distribution from about 1.2 to 5.0. It is even more preferred if the aromatic hydrocarbon has a ring and ball softening point from about 75° C. to about 140° C. and is present in an amount from about 2.5 to 7.5 weight percent of the total weight of the fiber-forming composition. Preferably the polypropylene is a propylene homopolymer having an isotacticity of 92 percent or higher. In an alternative preferred embodiment, the polypropylene is a blend of 70 percent of less ethylene-alkyl acrylate copolymer, preferably ethylene-methyl acrylate copolymer. Fine denier fibers or the invention obtained using the above-described improved fiber-forming compositions and having an improved balance of properties including tenacity, modulus and elongation at break have a denier per filament of 6 or less and melt flow rate of 14 to 40 g/10 min. Improved medium denier fibers of the invention will have a denier per filament between 6 and about 30 and are produced from using fiber-forming compositions having melt flow rates of 9 to 25 g/10 min.

DETAILED DESCRIPTION

The invention relates to polyolefin fibers and fiber-spinning process. More particularly, the invention relates to polypropylene (PP) fibers and process for their preparation.

PP resins utilized for the formation of fibers include homopolymers and copolymers of polypropylene as well as blends of these homopolymers and copolymers with minor amounts of other resins. Propylene polymers and polymer blends having have melt flow rates (MFRs) less than about 45 g/10 min and, more preferably, from about 15 to 40 g/10 min. determined in accordance with ASTM D 1248 are useful for melt-spinning of fine denier fibers, such as 6 denier per filament or less, by conventional processes for textile, apparel and industrial high tenacity fiber applications. PP polymers and blends with MFRs from 25 to 35 g/10 min are most useful for the formation of such fine denier fibers. PP polymers or blends suitable for making coarser fibers such as those needed for carpets in a bulk continuous fiber (BCF) process or for medium denier industrial fibers, will have MFRs in the range of 9 to 25 g/10 min, more preferably, from about 12 to 22 g/10 min. Such fibers have a denier per filament ranging between 6 dpf and 30 dpf.

Conventional processes of fiber formation from a melt involve extrusion of the polymer in the melt state from a spinnerette followed by drawing in a one step operation or in a second step. Utilizing lower MFR polymers for fine denier fiber formation significantly increases stresses on the spinline which causes melt fracture at nominal spinning speeds and, therefore, is not commercially feasible. On the other hand, using higher MFR polymers for coarse denier spinning results in excessive fiber breakage due to the material not having sufficient melt strength to sustain it in the melt for the comparatively longer time than required for finer fibers. One of the objectives of this invention is to provide a polymer that would have the melt strength for processing in coarser denier fibers as well as the ability to process fine deniers at conventional process speeds.

PP has been conventionally used to produce high tenacity fibers using a high tenacity fiber process which involves an additional hot air drawing zone. An example of this process would be the AUSTROFIL SML system designed for high tenacity fiber applications. Fibers having tenacities of between 5.5 to 7.0 gm/den and breaking elongations of 25 to 35% are commercially feasible using conventional PP homopolymers or copolymers through such a process. To achieve higher tenacities, it is necessary to draw the fibers to a greater extent; however, the breaking elongation of highly drawn fibers is significantly lower. It has been commercially observed that there is a maximum draw ratio that each polymer can be drawn beyond which the filaments start breaking during the drawing process. Yarns made with conventional PP and drawn to its maximum drawing point, typically have a breaking elongation of between 25% to 30%. It is an objective of the present invention to achieve a higher breaking elongation at a tenacity equivalent to that of conventional PP in identical fiber products of same denier and number of filaments. It is also the object of the present invention to produce fiber products having tenacities of up to 9 gm/den and breaking elongations of between 25% to 35%.

The ability to improve the physical properties of the fiber products has many advantages. It makes it possible for manufacturers to make finer fibers for upholstery and BCF applications with good physical properties. It also makes it possible to improve process speeds higher than what normally are achievable with conventional polymers. In BCF carpet applications it improves the resiliency of the tufted carpet as compared to homopolymer PP. It also makes it possible to develop softer feel carpets and upholstery fabrics.

In accordance with known procedures, conventional stabilizers to protect the resin against thermal degradation during the melt-spinning operation are included in the formulation. Conventional nucleating agents may also be included in the resin and, depending on the end use application, one or more stabilizers to protect the resulting fiber against oxidative and ultraviolet degradation may be present. These additives will generally be present in amounts not exceeding 2 weight percent and, more typically, in amounts from about 0.01 to about 0.5 weight percent. All weight percentages specified herein are based on the total weight of the fiber-forming composition unless otherwise specified.

Fibers of the invention having improved tenacity can be melt-spun using conventional procedures described in the art. In general, the melt-spinning operation can be carried out at temperatures as high as 290° C. and, more preferably, from 210° C. to 250° C. Temperatures much above these limits have little advantage and, in fact, can be detrimental due to excessive degradation of the PP. As is recognized by those skilled in the art, processing temperature and pressure as well as the size and shape of the spinnerette holes, spinning speed and draw ratio are selected to minimize melt fracture and optimize fiber properties. A detailed description of procedures used to melt-spin PP fibers is provided in U.S. Pat. No. 5,846,654, the disclosure of which is incorporated herein by reference.

While the fibers of the invention are useful for a variety of applications as will be apparent to those skilled in the art, their improved tenacity and general properties render them primarily useful for sewing threads, automotive airbags, seatbelts, industrial high tenacity belts, cordage, marine ropes, reinforced film for building construction, fiber reinforced composites and other high impact protective applications.

The ability to produce higher tenacity PP fibers and their use in several applications has significant advantages. The availability of a higher tenacity fiber enables the use of lesser amount of fiber in the production of a yarn or fiber-reinforced composite materials of equivalent load bearing ability. In effect, it enables to significantly reduce the weight of a part without compromising the physical properties of the composite as it relates to the mechanical strength of the composite. In other applications, the ability to increase the breaking elongation of PP fibers is an equally important aspect of the application. Higher elongation at an equivalently high tenacity allows the material to yield more before it breaks. This aspect is important in applications where the fibers go through a low impact, continuous loading and unloading hysterisis cycle.

Polypropylene (PP) resins utilized for the invention include propylene homopolymers and copolymers of propylene wherein propylene is the predominant monomer and blends of these resins with other propylene or nonpropylene-containing polymers. Representative comonomers which can be copolymerized with propylene to form useful copolymers include ethylene, butene-1, pentene-1,4-methylpentene-1, hexene-1,1,3-butadiene, styrene, methyl styrene and the like. Mixed comonomer systems may also be polymerized with the propylene. The homopolymers and copolymers are produced utilizing known polymerization catalysts and processes including slurry, liquid phase and gas phase procedures. Ziegler-Natta catalyst systems are most commonly used but other types of catalysts, such as metal-locene and heterometallocene catalyst systems, can also be used for this purpose.

Polymers which can be included with the propylene homopolymer or copolymer to form useful fiber-forming blends or alloys include polyesters, copolyesters, polyamides, copolyamides and acrylate polymers. When added to the propylene homopolymer or copolymer, these added polymers will generally constitute no more than 35 weight percent of the fiber-forming blend. More commonly, the additive polymers will constitute from 5 to 25 weight percent of the blend. Ethylene-alkyl acrylate copolymers, such as ethylene-methyl acrylate (EMA) copolymers, are a particularly useful class of additive polymers where fibers with enhanced dyeability are desired.

In one preferred embodiment of the invention, polypropylene homopolymers having an isotacticity of 92 percent or higher is employed. It is particularly advantageous when the homopolymer has good heat stability, i.e., is effectively stabilized so that the MFR will essentially be unchanged throughout the melt-spinning operation.

In another highly useful embodiment of the invention a polymer blend comprising 70 weight percent or greater polypropylene homopolymer and 30 weight percent or less ethylene-alkyl acrylate copolymer is employed. Suitable ethylene-alkyl acrylate copolymers include ethylene-methyl acrylate, ethylene-ethyl acrylate and ethylene-n-butyl acrylate copolymers wherein the alkyl acrylate copolymer constitutes up to 35 weight percent of the copolymer. Polymer blends of this type are described in U.S. Pat. Nos. 5,468,259; 5,550,192 and 5,576,366, the teachings of which are incorporated herein by reference.

From 1 to 10 weight percent aromatic hydrocarbon resin is included with the polypropylene to obtain the improved fiber compositions of the invention. Superior results are obtained at aromatic hydrocarbon resin levels of 2.5 to 7.5 weight percent, based on the total weight of the fiber-forming composition.

Aromatic hydrocarbon resins used for the invention relatively low molecular weight polymers obtained by polymerizing styrenic-based comonomers or aromatic monomer feed streams. The aromatic monomer feed streams can be pure or mixed monomer feed streams. These resins may also be selectively partially hydrogenated. The aromatic hydrocarbons will generally have weight average molecular weights ($M_w$) from about 300 to about 8000 and, more preferably, from about 500 to about 4000 and molecular weight distribution ($M_w/M_n$), sometimes also referred to as polydispersity, from about 1.2 to 5.0 and, more preferably, 1.4 to 2.5. Products within this range of $M_w$ and MWD will typically have ring and ball softening points from about 75° C. to 140° C. and minimum volatility at temperatures employed during the fiber-spinning operation, thus rendering them especially well suited for the instant application.

One group of aromatic hydrocarbon resins highly useful for the invention is obtained by the selective hydrogenation of resins polymerized using styrenic-based comonomers. The extent of hydrogenation can be from 30 to 100 percent. Such resins are typically neutral resins with acid numbers less than 1, saponification numbers less than 2 and bromine numbers from 2 to 8. Another group of selectively hydrogenated resins which are particularly useful for the invention are obtained from polymerized mixed aromatic monomer/feed streams. Products of this type are typically neutral resins with acid numbers less than 1 and saponification numbers less than 2. Still another group of aromatic hydrocarbons which can be advantageously employed for the production of high tenacity polypropylene fibers are obtained by polymerizing pure monomer feed streams. These neutral resin products typically have acid numbers less than 1, saponification numbers less than 2 and exhibit a low degree of unsaturation, i.e., bromine number less than 1.

All of the above-mentioned aromatic resins are available from commercial sources. For example, products are available from Hercules Inc. Resins Division under the tradenames REGALREZ, REGALITE and HERCOLITE and from Exxon Chemical Company under the tradename ESCOREZ. Since the properties of the aromatic resins can vary, the particular resins selected will depend on spinning conditions and the properties desired for the finished fiber.

The invention is further described by the following examples which are provide to be representative and illustrate specific embodiments but are not intended to be limiting with respect to the conditions and materials used.

In the experiments which follow two compositions were prepared by dry-blending polypropylene homopolymer (MFR 18; isotacticity 98.2 percent) with a small amount of an aromatic hydrocarbon resin having a softening point (R&B) of 140° C. $M_w$ 3100 and MWD 2.1. Composition A contained 10 weight percent of the aromatic resin (REGALREZ 1139; $M_w$ 3100; MWD 2.1) and had an MFR of 40g/10 min. Composition B contained 10 weight percent of the aromatic resin PLASTOLYN 140; $M_w$ 750; MWD 2.0 and had an MFR of 35 g/10 min. For comparison, a control composition prepared suing only the 18 MFR PP homopolymer, i.e., containing no aromatic hydrocarbon resin, was also included in this experiment.

Compositions A and B and the control were melt spun into fibers using a Hills PRL1 fiber-spinning machine. The polymers were extruded from a single screw extruder with a ramped-up temperature profile ranging from 220° C. to 245° C. The melt temperature was 240° C. Fibers were extruded from a spinneret having 128 holes and a delta cross section and were quenched by means of cross-flowing air maintained at a temperature of 130° C. A spin finish was applied to the fibers at about 1% level. The fibers were taken up by the feed godet at 700 rpm and at a temperature of 90° C. and drawn at a draw ratio of 3:1. The fibers were relaxed on a relax roll and then wound on a spool using a Leesona winder. The melt pump speed was controlled to achieve a final denier of drawn fibers of 1100.

Properties of the resulting fibers were as follows:

| Fiber Composition | A | B | Control |
| --- | --- | --- | --- |
| Modulus (gm/den at 10% elongation) | 8.7 | 7.7 | 5.9 |
| Breaking Elongation % | 184.1 | 171.1 | 124 |
| Tenacity (gm/den) | 2.46 | 2.45 | 2.49 |

It is apparent from the above data that an approximately 50–60% increase in breaking elongation is realized with the compositions of the invention (A and B) versus the control. Accordingly, the drawability, i.e., stretchability, of the fibers is enhanced so that as will subsequently be demonstrated, they can be processed at even higher draw ratios to produce fibers of considerably higher tenacity. Additionally, the fibers produced with the compositions of the invention had higher moduli. A fiber with higher modulus is a stiffer fiber which is desirable in applications where increased resiliency is desired, such as for tufted cut pile carpeting. Furthermore, the ability to increase both modulus and elongation is unexpected. With conventional PP fibers, any increase in elongation is generally accompanied by a corresponding decrease in modulus.

In another experiment, a 30 MFR PP homopolymer was blended with REGALREZ 1139. These compositions, identified as Sample C and Sample D, contained 2% and 5% of the Regalrez 1139, respectively. The resulting MFRs for these samples were 36.8 and 38.4 g/10 min, respectively. Three hundred (300) denier-fibers were spun from these compositions and from a 30 MFR PP control resin containing no aromatic hydrocarbon additive and results are reported in the table which follows.

| Fiber Composition | C | D | Control |
| --- | --- | --- | --- |
| Tenacity (gm/den) | 3.40 | 3.42 | 3.10 |
| Breaking elongation (%) | 103 | 92.4 | 64.1 |
| Modulus (gm/den) | 21.8 | 21.3 | 20.9 |

A significant increase in elongation as well as tenacity is observed with samples C and D.

In a yet another experiment, a sample comprising 95% PP homopolymer and 5% Plastolyn 140 and having a MFR of 30 was spun on a high tenacity AUSTROFIL SML fiber line. In addition to the two draw zones, this equipment has a hot air chamber which was maintained at 175° C. The PP composition, identified as Sample E, was spun at a melt temperature of 222° C. and the fibers were quenched by air at 18° C. Duo speeds and temperatures were as follows:

| Duo 1: | 414 m/min | 90° C. |
|---|---|---|
| Duo 2: | 1573 m/min | 115° C. |
| Duo 3: | 2670 m/min | 130° C. |
| Hot Air: | | 175° C. |
| Total Draw ratio: | 6.45 | |

Fiber was also produced under identical conditions using a 30 MFR PP homopolymer control resin containing no aromatic hydrocarbon additive. The resulting fibers were evaluated with the following results:

| Fiber Composition | E | Control |
|---|---|---|
| Tenacity (gm/den) | 8.1 | 7.0 |
| Elongation (%) | 36 | 32 |

Whereas, the control homopolymer PP could not be drawn further without breaking individual filaments on the godets, the composition of the invention (E) could be drawn to even higher draw ratios to produce even higher tenacity products. In another experiment, sample E was drawn to a total draw ratio of 7.1. The resulting fibers of this run had a breaking elongation of 30% and a tenacity of 8.6 gm/den.

We claim:

1. A polyolefin fiber having an improved balance of properties comprising 90 to 99 weight percent polyolefin and 1 to 10 weight percent aromatic hydrocarbon resin.

2. The fiber of claim 1 wherein the polyolefin is a polypropylene resin selected from the group consisting of propylene copolymers or blend of propylene homopolymer or copolymer with a nonpropylene-containing polymer.

3. The fiber of claim 2 wherein the aromatic hydrocarbon resin has a weight average molecular weight from about 300 to 8000 and molecular weight distribution from about 1.2 to 5.0.

4. The fiber of claim 3 wherein the aromatic hydrocarbon resin is selected from the group consisting of selectively hydrogenated resins of polymerized styrenic-based polymers, resins obtained from polymerized mixed aromatic monomer feed streams, and resins obtained by polymerizing pure monomer feed streams and constitutes from 2.5 to 7.5 weight percent of the total weight of the fiber-forming composition.

5. The fiber of claim 4 wherein the aromatic hydrocarbon resin has a weight average molecular weight from about 500 to 4000 and molecular weight distribution from about 1.4 to 2.5.

6. The fiber of claim 5 wherein the aromatic hydrocarbon resin has a ring and ball softening point from about 75° C. to about 140° C.

7. The fiber of claim 3 wherein the polypropylene resin is a propylene homopolymer having an isotacticity of 92 percent or higher.

8. The fiber of claim 3 wherein the polypropylene is a blend of 70 percent or greater polypropylene homopolymer and 30 percent of less ethylene-alkyl acrylate copolymer.

9. The fiber of claim 8 wherein the ethylene-alkyl acrylate copolymer is a copolymer of ethylene and methyl acrylate.

10. The fiber of claim 1 which is obtained by melt-spinning.

11. The fiber of claim 1 having a denier per filament of 6 or less and melt flow rate of 15 to 50 g/10 min.

12. The fiber of claim 1 having a denier per filament between 6 and 30 and melt flow rate of 9 to 25 g/10 min.

13. A polypropylene fiber having an improved balance of properties comprising 90 to 99 weight percent propylene homopolymer having an isotacticity of 92 percent or higher and 1 to 10 weight percent of an aromatic hydrocarbon resin having a weight average molecular weight from about 300 to 8000, molecular weight distribution from about 1.2 to 5.0 and selected from the group consisting of selectively hydrogenated resins of polymerized styrenic-based polymers, resins obtained from polymerized mixed aromatic monomer/feed streams, and resins obtained by polymerizing pure monomer feed streams.

14. The fiber of claim 13 wherein the aromatic hydrocarbon resin has a ring and ball softening point from about 75° C. to about 140° C., an acid number less than 1 and saponification number less than 2.

* * * * *